United States Patent
Edmonds

(10) Patent No.: US 9,910,261 B2
(45) Date of Patent: Mar. 6, 2018

(54) PHONE CASE WITH BUILT-IN MAGNIFICATION DEVICE

(71) Applicant: Caroline Edmonds, Fountain Valley, CA (US)

(72) Inventor: Caroline Edmonds, Fountain Valley, CA (US)

(*) Notice: Subject to any disclaimer, the term of this patent is extended or adjusted under 35 U.S.C. 154(b) by 43 days.

(21) Appl. No.: 14/797,107

(22) Filed: Jul. 11, 2015

(65) Prior Publication Data
US 2017/0013097 A1    Jan. 12, 2017

(51) Int. Cl.
| | |
|---|---|
| *G02B 25/00* | (2006.01) |
| *G02B 27/02* | (2006.01) |
| *G02B 27/04* | (2006.01) |
| *H04M 1/02* | (2006.01) |
| *H04M 1/18* | (2006.01) |
| *H04M 1/21* | (2006.01) |

(52) U.S. Cl.
CPC ......... *G02B 25/002* (2013.01); *G02B 27/025* (2013.01); *G02B 27/026* (2013.01); *G02B 27/04* (2013.01); *H04M 1/027* (2013.01); *H04M 1/185* (2013.01); *H04M 1/21* (2013.01)

(58) Field of Classification Search
CPC ............ H04M 1/0206; H04M 1/72519; G02B 25/002
See application file for complete search history.

(56) References Cited

U.S. PATENT DOCUMENTS

| | | | |
|---|---|---|---|
| 7,792,550 B2* | 9/2010 | Lishan | H04M 1/21 455/566 |
| D695,731 S | 12/2013 | Adami | |
| 2004/0204204 A1 | 10/2004 | Brilliant | |
| 2006/0276220 A1 | 12/2006 | Schure | |
| 2012/0176689 A1* | 7/2012 | Brown | G02B 3/08 359/742 |
| 2015/0338635 A1* | 11/2015 | Gantz | G02B 25/002 345/32 |

FOREIGN PATENT DOCUMENTS

CN    201479178    *    5/2010    .............. H04M 1/02

OTHER PUBLICATIONS

"Bigger Size CellPhone Mobile Phones Screen Magnifier Zoom Magnifying Glass Folding Screen HD Amplifier #71601" retrieved on Dec. 6, 2016 at http://24kgoldstick.com/product/bigger-size-cellphone-mobile-phones-screen-magnifier-zoom-magnifying-glass-folding-screen-hd-amplifier-71601/ published on May 23, 2015, pp. 1-6.*
Pdf of Google Search Results.*

* cited by examiner

*Primary Examiner* — Patrick Edouard
*Assistant Examiner* — Eboni Hughes

(57) ABSTRACT

A foldable support includes a shell, a cover, a lens, and a stand. The shell receives and secures a mobile device having a screen. The cover rotatably connects to the shell. The lens rotatably connects to the cover. The stand rotatably connects to the lens.

20 Claims, 6 Drawing Sheets

PHONE CASE WITH BUILT-IN MAGNIFICATION DEVICE

BACKGROUND

1. Field

A case for a mobile phone includes a magnification device to enlarge images from a display screen of the mobile phone.

2. Background Information

A smart phone is a mobile phone with an advanced mobile operating system. Most smart phones have a touch screen that provides images to a user and receives input from the user. However, there are a large number of older adults that cannot easily see the screen of their smart phone due to difficulty focusing on near objects.

The problem of elder usability of smart phones is significant. Out of 320.2 million people living in the United States in 2014, 235 million people use mobile devices. In other words, 73% of Americans use mobile devices. At the same time, 150 million people use corrective eyewear to compensate for farsightedness or nearsightedness. Seventy five percent of these 150 million, or 112,500,000 people, are adults.

Adults over age 40 might need assistance seeing their phone. Many peoples' eyes deteriorate from hyperopia, macular degeneration, impending cataracts, and other eye conditions, that interfere with sight. In the United States, 12 million adults over the age of 40 are farsighted. Out of the 242,470,820 adults in the United States, 70% get eyestrain from using electronic devices. That is to say, 169,729,574 adults, or roughly one-third, of the American population that get eyestrains.

Out of the 320.2 million people in the United States, 62% (198.5 M) use smart phones regularly. In a recent study, the study reported that the most common actions adults use on their smart phones is sending and receiving text messages (81%), accessing the web (61%), or reading or receiving e-mails (52%). It is desirable to improve elder usability of smart phones.

BRIEF SUMMARY

In an example, a foldable support includes a shell, a cover, a lens, and a stand. The shell receives and secures a mobile device having a screen. The cover rotatably connects to the shell. The lens rotatably connects to the cover. The stand rotatably connects to the lens.

Figure 1:
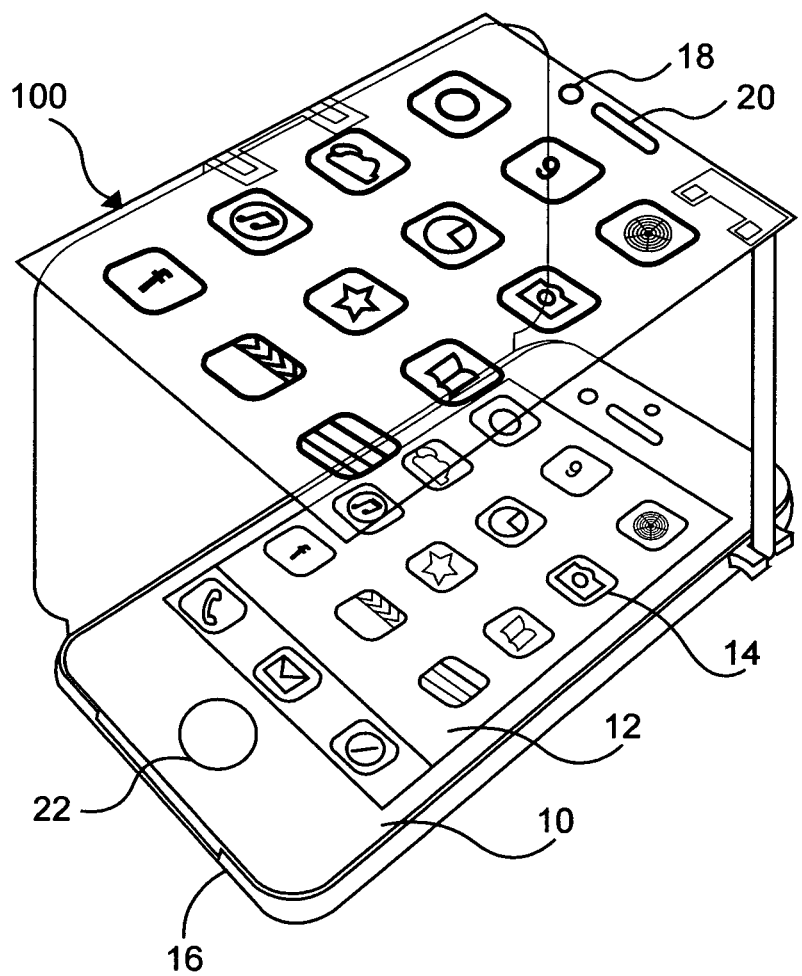
FIG. 1 is an isometric view of a foldable support 100 assembled with a mobile device 10.

The drawings contain as many views as necessary to show the invention per 37 CFR 1.84(i).

DETAILED DESCRIPTION

A smart phone is a mobile phone with an advanced mobile operating system. There are a large number of adults that cannot easily see the screen of their smart phone due to difficulty that comes with age, including focusing on near objects. Other eye issues interfere with using a smart phone like macular degeneration, cataracts, eyestrains, and other complications to see phone well. In view of this, there is a large target market of adults in the United States that use smart phones and would benefit from a product that addresses their need. This market ranges from 12 million (from and exact quantity) to over 150 million (using the number of smart phone users and eye issues data combined). This target market estimate could rise to well over 150 million when considering the entire world.

At the time of the invention, the inventor was a student attending public school in Huntington Beach, Calif. In considering solutions to the difficulty some have in seeing the screen of their smart phone, the inventor sought to develop a magnifying device to help a lager market of farsighted adults with smart phones see their phone screen better and more quickly, essentially giving them quick sight. Some of the initial design criteria developed by the inventor include accessible quickly, quick glance to view phone, put away quickly or detachable, be able to see more clearly (e.g., 2× magnifies), be able to type and use screen while magnified, hands free typing, quicker than putting on glasses (time), and able to magnify all applications: text, maps, email.

There have been a few previous attempts at solving the problem of providing quick sight, but none has been very effective. Two main devices were very bulky and inconvenient. The prior devices were too thin and weak, inconvenient, or were impractical for when and how the smart phone would be used. One case was impractical, since it had to be set down on a flat surface to be viewed. Another one would take finding the device in a purse and setting it up. Most devices did not fold back away easily, or the device was a separate piece to lose, or too bulky as the arm stuck out on the side a lot. One device utilized a miniature lens, but did not allow a user to use both hands while using their phone. Another used a handheld lens, which made it difficult to browse the internet, send a text message, or compose an e-mail, the most popular activities to do on a smart phone according to a study.

Towards addressing the above issues, the inventor developed a foldable support having a lens system. The inventor's design incorporates a wallet style phone case. The foldable support for a lens system prevents the device from being lost, has a quick setup, and gives the quick sight, while still offering hands free typing.

In developing the embodiments, the inventor explored four concepts: 1) Side clip-on device, 2) Attaches to the phone and possibly telescopes or expands, 3) Phone case with a magnifier folding out, and 4) Wallet phone case with magnifier residing above. The concepts the inventor explored included a magnifier side clip, a telescoping device, or two ways a magnifier could be built into a phone case. The more the inventor started to sketch and think about the clip-on, the more the inventor saw the impracticality of it. The initial thinking was that it was not convenient because after the user was finished with it, where does he or she put the clipped device? In addition, the clip might be knocked off or broken hanging off the side or around a mobile phone. In addition, pulling out the clip and snapping it on is about the time equivalent of pulling out reader glasses, so the inventor initially did not see time or convenience in the clip design.

The second design the inventor looked at was a telescoping lens that could be used but pulling up above the phone case. One design would be a bumper case style, or just on the four outer edges of the phone. Then from the bumper case, the Fresnel lens, which was already on the surface of the screen, could telescope upward. This design would help sight but not clear how the user could really type with both hands on this style. In addition, this design would be more complicated with more parts and a twist or something to hold it in place at the top. The inventor did not use this in the preferred embodiment because it did not, at the time, meet the requirements of a sturdy design and hands free typing, thought it did meet seeing the phone screen better and quicker though.

The last concepts 3) Phone case with a magnifier folding out, and 4) Wallet phone case with magnifier were phone case designs using a standard case. For concept 3) Phone case with a magnifier folding out, the inventor explored a standard phone case. The inventor would have a Fresnel lens fold out above the screen and then have an arm (or two arms) tuck in below the front camera. The arm would unhinge and come over top of the phone. This concept was working very well on paper until the inventor went looking for materials. On paper, it met all the design requirements of accessible quickly, quick glance to view phone, able to put away quickly, see the screen hands free, quicker than putting on glasses, and able to read anything magnified. The inventor then realized the inventor did not have the materials to create the arm. The inventor then focused on 4) Wallet phone case with magnifier were phone case designs using a standard case. Using a few butt hinges, the inventor simplified the arm design with a folded magnifier and added a "kickstand" to form a prototype for testing that was easy to use.

In developing the case, the inventor had to tinker around with the case design, concluding a wallet style would work best for her requirements. Issues she faced included supporting the lens and keeping it sleekly hidden when not in use, using inexpensive materials to produce a wallet case/cover, issues over various widths for the device inside and stiffness of the material used in an end production.

The inventor desired to attach the magnifier in a sleek but practical way so the magnifier could be used quickly, put away quickly, and not interfere with phone functions. The inventor explored lots of hinges, adhesives, and designs in this phase: size of the lens, how far away from the screen (the inventor determined that two inches was optimal), and movement of the lens or hinges.

Deriving the support for the lens over the screen was tricky, as the lens had to cover most of the screen, magnify it, and yet let a user text or type or touch the screen below the lens. The inventor ended up with a kickstand concept and played with many materials to find a sturdy stand design.

The embodiments will become more fully apparent from the detailed description thereof, taken in conjunction with the accompanying drawings.

FIG. 1 is an isometric view of a foldable support 100 assembled with a mobile device 10. The mobile device 10 includes a screen 12 and may be a computing device that is small enough to be held in a user's hand in an orientation that present the screen 12 to the user. As a touch screen, the screen 12 serves as an input device that receives user input with a special stylus/pen and-or one or more fingers. In a typical operation, the user brings their index finger to hover over the screen 12 and then moves the finger down to touch the screen 12. For example, the screen 12 may display icons 14, which represent pictograms that are part of a graphical user interface. Through the icons 14, a user can give input or control the information processing system of the mobile device 10 through simple or multi-touch gestures by touching the screen 12.

The screen 12 of the mobile device 10 also may serve as a display screen that, as an output device, provides an electronic visual display of an information processing system within the mobile device 10. The mobile device 10 may include a frame 16 surrounding the mobile device 10 and, as a mobile phone, the mobile device may include a camera 18, a microphone 20, and a home button 22 that additionally may serves as a touch identification sensor. In addition to being a mobile phone, the mobile device 10 also could be a tablet computer. In example, the mobile device 10 may be a Samsung Galaxy (trademark) I9500 S4 measuring 5.38 inches length, 2.75 inches width, and 0.31 inches thick.

Figure 2:
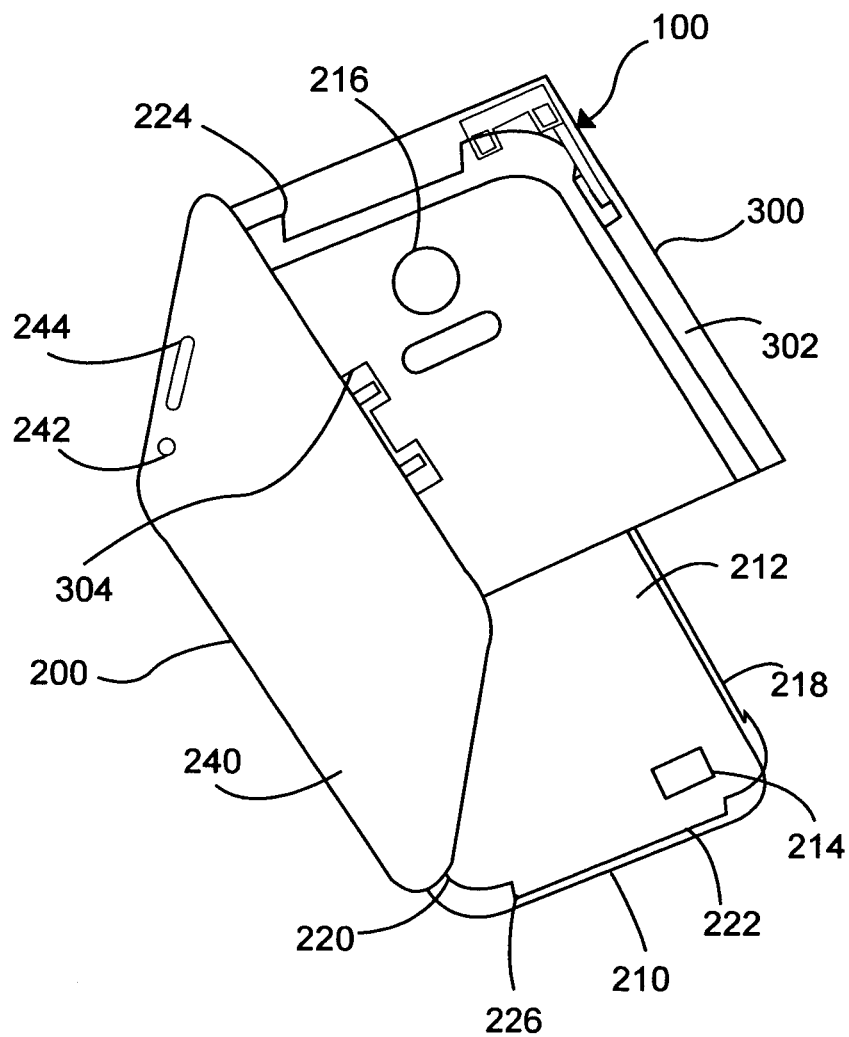
FIG. 2 is an isometric view of the foldable support 100 without the mobile device 10.

FIG. 2 is an isometric view of the foldable support 100 without the mobile device 10. The foldable support 100 includes a case 200 and a lens system 300. The case 200 may include a shell 210 and a cover 240.

The shell 210 may include a backing 212 having a speaker port 214 and a camera port 216 disposed through the backing 212. The backing 212 may provide a rigid support against which the mobile device 10 may reside. The speaker port 214 may permit sound to be transmitted from the mobile device 120 and the camera port 216 may allow light to enter into the mobile device 10 for photographs or moving images.

The shell 210 additionally may include a right sidewall 218 and a left sidewall 220. The term right and left are based on a particular perspective. For example, in other perspectives, the sidewall 220 may be thought of as a top or right sidewall and the sidewall 218 may be thought of as a bottom or left sidewall, respectively. The terms right and left do not limit the scope covered by the sidewall subject matter.

Each sidewall 218 and 220 may be rigid and extend perpendicularly away from a backing rim 222 of the backing 212. When the mobile device 10 is placed within a hard shell 210, the resilient sidewalls 218 and 220 of the hard shell 210 provide a contractible force to clip the mobile device 10 securely in place against the backing 212 so that the mobile device 10 is secured in the shell 210. The right sidewall 218 and the left sidewall 220 may extend around the backing rim 222 while leaving a top gap 224 and a bottom gap 226. The top gap 224 and the bottom gap 226 may provide an opening within the sidewalls 218 and 220 through which the mobile device 120 may receive cords, such as communication and power cords, or emit sound through a speaker.

The cover 240 portion of the case 200 may serve to close over the mobile device 10 to form a container with the shell 210 for the mobile device 10. The cover 240 may be similar to the backing 212 in that the cover 240 may provide a rigid support against which the mobile device 10 may reside when held upside down. The cover 240 may include a camera port 242 to allow light to enter into the mobile device 10 and a microphone port 244 to allow sound to enter into the mobile device 120 through the cover 240.

Figure 3:
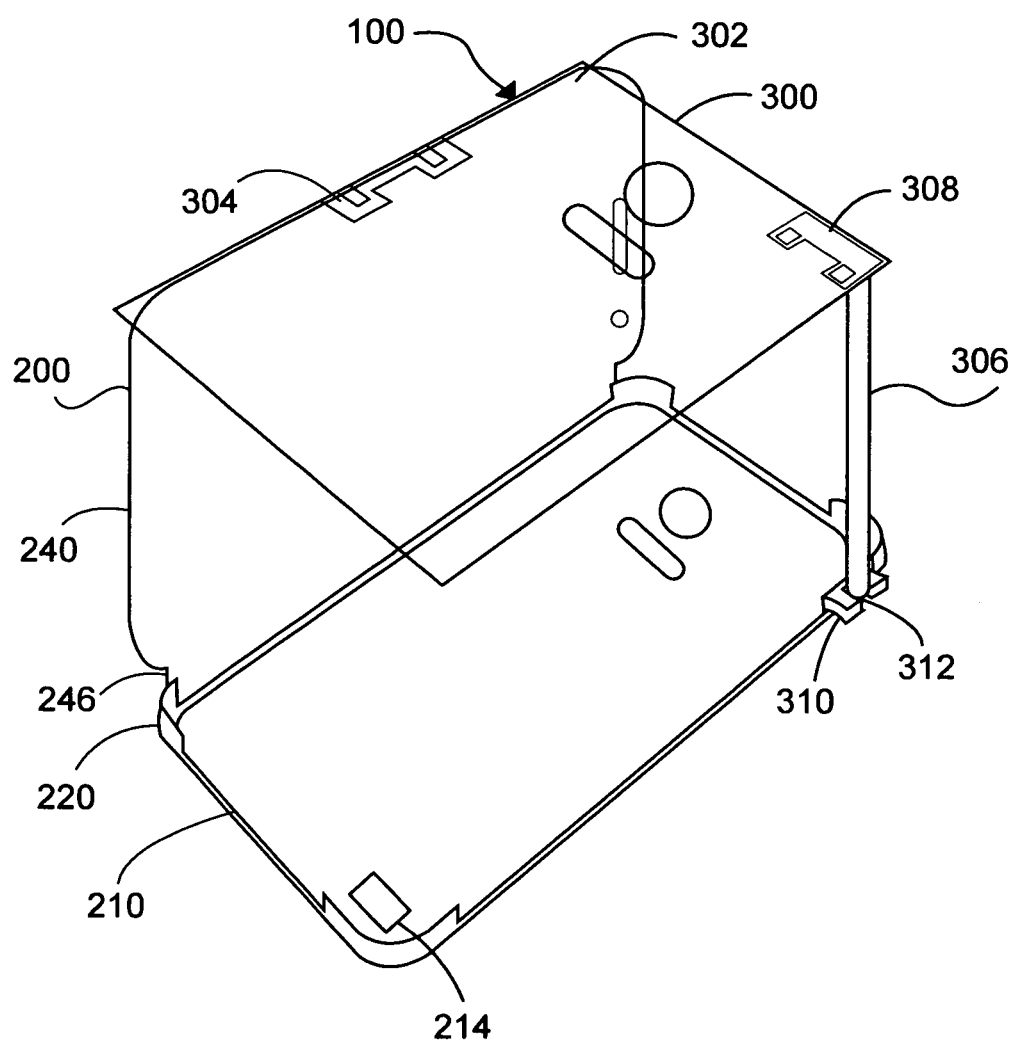
FIG. 3 is an isometric view of the foldable support 100.

FIG. 3 is an isometric view of the foldable support 100. As illustrated, the shell 210 and the cover 240 are connected together via a case hinge 246. The case hinge 246 may be a type of bearing that connects the shell 210 and the cover 240 while allowing rotation between them. In an example, the case hinge 246 may be made of a pliable material, such as leather or plastic, and extend eighty percent of the length of the left sidewall 220. In another example, the case hinge 246 may include vinyl leather or be made from a generic white vinyl case.

The lens system 300 is illustrated in FIG. 3. The lens system 300 includes a lens 302, a lens hinge 304, a stand 306, a stand hinge 308, and a stand clip 310. The lens hinge 304 may connect the lens 302 to the cover 240, the stand hinge 308 may connect the stand 306 to the lens 302, and the stand clip 310 may be configured to receive and secure a distal end 312 of the stand 306.

Figure 4:
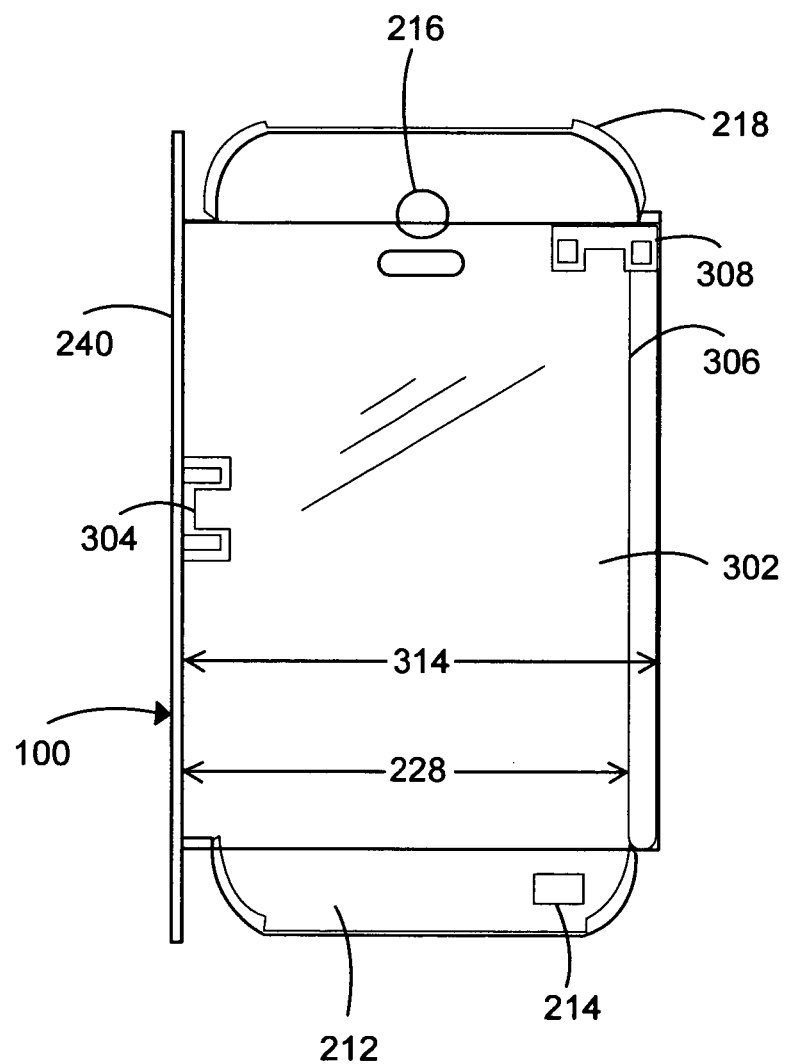
FIG. 4 is a plan view of the lens 302 as part of the foldable support 100.

FIG. 4 is a plan view of the lens 302 as part of the foldable support 100. The lens 302 may be a single transparent component of refractive material having opposed refracting surfaces. In an example, the lens 302 may include a surface consisting of a concentric series of simple lens sections which make a thin lens with a short focal length and large diameter. In another example, the lens 302 may be a Fresnel lens. In a further example, the lens 302 may be a plurality of transparent components arranged along an optical axis with their opposed refracting surfaces disposed transversely of such axis. In this further example, the opposed surfaces may be so shaped and spaced that the component or plurality of components are capable of producing, from light rays passing there through from the screen 12, a single image of that object at a focal point.

A Fresnel sheet is a lightweight plastic sheet that magnifies something, where magnification includes an action or process of magnifying something by making it larger or more visible. The lens 302 may include a convex lens, where that convex lens makes parallel light rays bend inwards at meet at the focal point. A convex lens makes rays of light converge to the focal point. The people targeted for purchase and use of the foldable support 100 are people who likely need convex lenses for hyperopia, which in an example is the Fresnel lens. In a convex lens, the material bulges outwards in the center like a glider. The opposite is concave lens, which curves light rays out. A concave lens would be used for a nearsighted person. That is to say, the lens 302 could be configured as a nearsighted lens to help those who have difficulty focusing on the screen 12 when the screen 12 is positioned far from the user's eyes. In an example, the lens 203 may be a two times (2×) magnification Fresnel sheets cut from a 7 inch×10 inch sheet. In another example, a width 314 (FIG. 4) of the lens 302 may be greater than a width 228 of the backing 212.

The lens hinge 304 may be a type of bearing that connects the lens 302 and the cover 240 while allowing rotation between them. In one example, lens hinge 304 limits the rotation between the lens 302 and the cover 240 to one-hundred eighty degrees.

The stand 306 may be a rigid post. In an example, the stand is based off a side piece of a frame for eyeglasses that extends from the temple and over the ear. The stand 306 may telescope, expand, and/or collapse. In another example, the stand 306 may be made from a ten-inch plastic rod having a diameter of ⅛ of an inch.

The inventor evaluated different style of kickstands for the stand 306. First was the type of material: plastic, silicon, and or metal. After testing durability and sleekness, the inventor picked a metal reading glasses arm (officially called a temple) and cut the bent ear piece off because the bent ear piece was more durable than the other option, meeting the durability design requirement.

One of the very first kickstands was part of old glasses the inventor, a sidepiece or the temple, but after the process of building the device, the surface area to glue it to the magnifier was found to be too small. The inventor tested a few other different styles from pieces of glasses, but they were either too thick, curvy, or were not flush enough against the magnifier. The inventor acquired some different, cheap materials, plastic, and silicone. The inventor cut plastic rulers and phone cases into two different shapes, rectangular and angle. Although these materials were flusher against the Fresnel sheet, they were not wide enough on the end to support the surface of the magnifier. Therefore, the inventor debated and went back to the reader glasses idea, but instead the inventor found reading glasses with a thin metal outside piece. The inventor attached a small rubber piece, the inventor found in her Dad's spare hardware, to the metal. The inventor preferred this design because it was sleek, stayed flush to magnifier, and had good support while in use with the rubber piece.

The inventor also pondered on the idea of using two kickstands that would help hold the magnifier up. However, when the inventor started sketching the concept, the inventor ran into a problem of not enough folding space to hide both kickstands. The two kickstand approach also did not meet one of her requirements—putting the device away quickly— since there were too many moving parts. As such, in one embodiment, the folding support 100 is configured to include no more than one stand 306.

Figure 5:
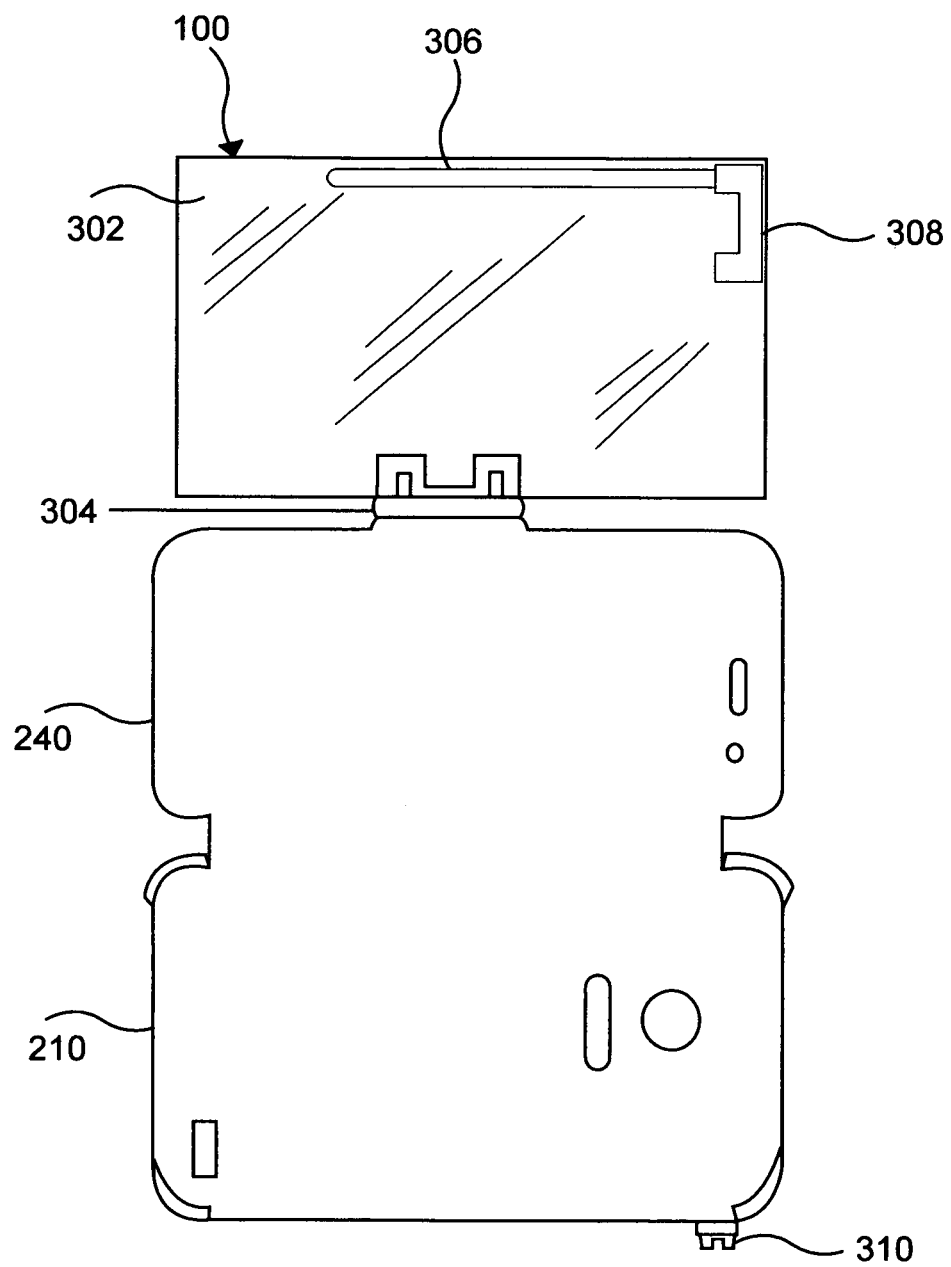
FIG. 5 is an open view of the stand hinge 308 in the foldable support 100.

FIG. 5 is an open view of the stand hinge 308 in the foldable support 100. The stand hinge 308 may be a type of bearing that connects the stand 306 and the lens 302 while allowing rotation between them. In one example, stand hinge 308 limits the rotation between the lens 302 and the cover 240 to ninety degrees.

The lens hinge 304 and the stand hinge 308 may have a similar or different configuration. For example, any of four basic types of hinges may be used for the lens hinge 304 and/or the stand hinge 308: the butt hinge, butterfly hinge, flush hinge and a barrel hinge. Butt hinges can be from 13 millimeter (mm) to 150 mm, but the most common use for them is in cabinets and other home appliances. Butterfly hinges are similar to butt hinges but can be adjusted once they are fitted. The flush hinge has two parts, a larger rectangle, and a thicker, smaller rectangle. It is normally used in lightweight doors and small box construction. The last main type of hinge is the barrel hinge, which comes in two parts. There is a thread part of the hinge, which screws into pre-drilled hole. There can be dismantled and used in a variety of projects and objects. Other hinges that may be utilized for the lens hinge 304 and the stand hinge 308 are tee, concealed, and piano.

The lens hinge 304 and the stand hinge 308 preferably are based on a box set hinge having engineering principles similar to a butt hinge. A butt hinge is a hinge for a door or the like, secured to the butting surfaces rather than to the adjacent sides of the door and its frame. A pin is down the center with a leaf on either side. Barrels over top of the pin are normally in an odd number. The strength of a particular butt hinge depends on the thickness and the ease of movement of the barrel and the pin. The middle of the pin acts as the center of rotation. In one example, the lens hinge 304 and the stand hinge 308 may be a ¾ inch by 1-inch butt hinge or a ⅞ inch set up box hinge used without black band.

The inventor tested different types of hinges for the lens hinge 304 and the stand hinge 308. The inventor first bought inset hinges and small brass butt hinges. After toying around with the hinges in different places, the inventor realized the inset hinge was excessively big for the case and the butt worked somewhat, but was not very thin or sleek. The inventor found a box hinge, originally made for jewelry boxes. After testing and building a sample of the device with the hinge, the inventor learned it was strong enough to meet design and engineering requirements, and yet was sleek and thin enough not to make the case bulky. In addition, this hinge desirably would lock at the right angles.

The inventor tried to use many different types of glue, including super glue, hot glue, and vinyl glue, to adhere the stand 306 to the stand hinge 308 and the lens hinge 304 to the lens 302. For gluing a vinyl cut-out, the inventor tried different amounts of Liquid Nails (trademark) because it seemed in the earlier cases the inventor had built the glue that the inventor had applied and spread out was too thick, since the phone barely fit in it.

The vinyl adhesive worked the best when attaching the vinyl to the original cover piece and gluing hinges to Fresnel lens. The super glue worked the best as reinforcement for the box hinges, with the kickstands and Fresnel lens. The Liquid Nails worked the best gluing the vinyl sheet with the plastic case. Adhesives used may include liquid nails adhesive, instant vinyl, Loctite (trademark) super glue, and hot glue The stand clip 310 (FIG. 5) may be a resilient fastener configured to receive and secure a distal end 312 (FIG. 3) of the stand 306. In an embodiment, the stand clip 310 is a side clip-on device that includes two arms that come about to face towards one another to created a gap and an open center portion into which the distal end 312 of the stand 306 may be secured. When the foldable support 100 is closed, the stand 306 is rotated parallel to and against the lens 302, the lens 302 is rotated parallel to and against the cover 240 so that the stand 306 is sandwiched between the cover 240 and the lens 302, and the cover 240 is rotated parallel to and against the mobile device 10.

Figure 6A:
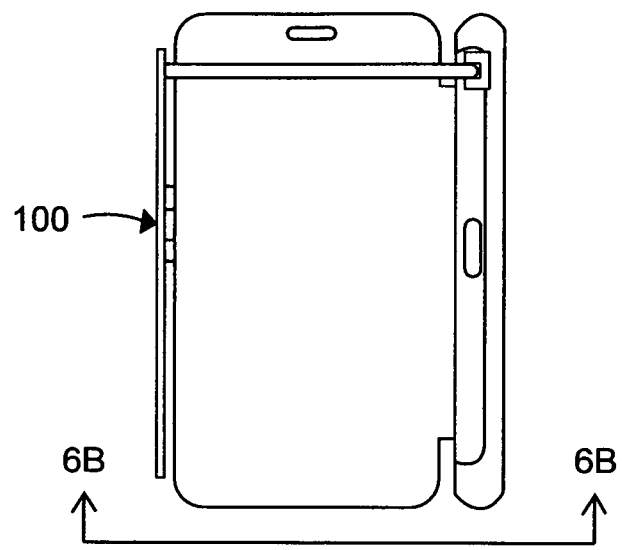
FIG. 6A is a side view of the foldable support 100.
Figure 6B:
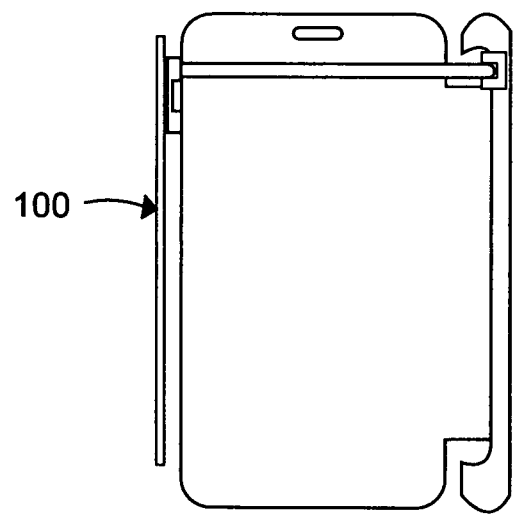
FIG. 6B is a side view of the foldable support 100 take off line 6B-6B in FIG. 6A.

FIG. 6A is a side view of the foldable support 100. FIG. 6B is a side view of the foldable support 100 take off line 6B-6B in FIG. 6A. An embodiment of the foldable support 100 may be assembled as follows.

Take the regular plastic wallet case and carefully peel the thin foam piece from the inside of the case, and the cover connecting to the piece. Put the plastic case aside, since it will not be needed for a little bit. With the extra vinyl bought, trace the material that was just pulled off the case. Add extra vinyl, less than inch, for the seam to fit the Fresnel lens. Cut tracing out. With piece pull off from the original device cut it, so only the cardboard/vinyl covering piece is left. Glue the vinyl cutout into the plastic case with Liquid Nails (trademark) or Instant Vinyl (trademark). Caution, do not put too much Liquid Nails on plastic case. Next, with metal hinge stuck out of the sandwich of the added vinyl and original apply hot glue and super glue, and then add the cut magnifier sheet. When the two pieces are dry, unfold the magnifier so it is lying flat on the surface below it, facing upwards. Now, on the upper right hand corner glue another box set hinge with super glue to the magnifier.

First Embodiment

As for a first embodiment, the inventor made a foldable support 100 for the Samsung Galaxy S4. It has a ¾ inch bind for folding and uses to box hinges. To glue the vinyl into the plastic case, the inventor laid out Liquid Nails on the plastic case. For attaching the original cover piece to the vinyl cutout the inventor used Instant Vinyl. When attaching the box hinge into the sandwich of materials, the inventor super glued the hinge to the original cover sheet, then for extra strength and durability, the inventor covered where the box hinge attached with duct tape. The Fresnel lens size the inventor used approximately was 4 inches long and 2.75 inches wide. Glued to the lens was a box hinge in the upper right hand corner. To connect the kickstand to the hinge, the inventor applied multiple layers of super glue because the plastics do not seem to stick very well to the metal with one coat of super glue. The kickstand was a curved side part of a pair of readers. This was not very streamline, but was somewhat stable.

Second Embodiment

The second embodiment the inventor made also was for the Samsung Galaxy S4, it has a ½ inch binding for the following case embodiment. The inventor used the same type of glue for gluing all the materials together except for the kickstand attached to the hinge. For the kickstand, the inventor decided on the thinner metal part off the side of one of the glasses and attached it by super glue on the bottom and a hot glue sealant over top. The inventor did not use duct tape to reinforce the glue because the inventor learned that the glue stayed* pretty well together, but they do add a little bend to the top cover.

Third Embodiment

The revisions the inventor made in this third embodiment are the kickstand and a clip on the side of the case. The inventor molded the kickstand slightly different to fit into the clip. The inventor added the clip after receiving 5 surveys, seeing there was a need to change in order to continue testing. The inventor utilized the same thin metal bar from the sides of glasses or the temple. To make it thicker, the inventor covered the metal bar with a tiny plastic tube, with ⅛ of an inch diameter. Adding the right diameter to snap nicely into the case. The inventor also made the binding on the phone smaller, to have the phone not gap as much. The binding was too big on the other cases, so the kickstand was not working as well as it should of. This embodiment was preferred because each part of the design was optimized.

Testing

To test the embodiments, the inventor developed survey questions and needed at least 30 people in order to see if her prototype would solve their problem and if the prototype met the design requirements. The inventor had to develop a structured questionnaire or "survey" to confirm these people were in her target range, if they liked the device, how they would use it, and even if they would buy it. The inventor let the person play around with the device for two minutes, and then have them take a questionnaire. The numbers from the survey questions will be statistics for her results and testing.

The inventor interview and emailed older friends, teachers, family, and people at her Dad's work that were in the target range of 40 years old and up. The inventor wanted people that used reading glasses (already had hyperopia) and used smart phones. (This was her first question to ask them and if they did not, then the inventor did not have them take the survey.)

The inventor made two different ways to test her device. The inventor would show people her device in a quick minute or so demo on how it opens up and folds away, can view the screen, etc. Then let them ask questions about it or play with it a bit. Finally, they would fill out a survey. See survey of 10 questions below. Her first 18 surveys were in-person interviews to gather feedback on her device.

To reach more people, the inventor could make a video of the device on how it opens quickly, how one could view the screen, then how it fold up and the inventor shot different angles of the device with her phone in it. The inventor also enjoyed making videos as a hobby so the inventor put the video together quickly. The inventor emailed it out to friends and family. After someone confirmed that they use reader glasses and have a smart phone, they would click on a link to see her device video and then go straight into survey monkey to take the same survey of ten questions. The inventor sent this link to friends of her parents and grandparents and teachers. All the answers from in person were combined with the online answers from Survey Monkey (trademark), by manually entering the survey result in from the in-person demos.

The survey results varied with the different ages of people, from 1 over 75 down to 10 under 45 people. The inventor also had a wide variety of glasses' prescriptions from +1 to +3 so this confirmed her hyperopia target. Her design criteria were met since 96.23% people see a benefit in this device and 73.58% would use the device.

The inventor wanted to make her device easy to use, quickly, having the convenience of a magnifier, the ability to text, email, etc. while the phone is magnified. In question 5 on her online survey where people were allowed to pick all reasons why they liked and would use this case, the top three choices were the ability to see the phone better, the convenience of a magnifier, and the ability to text, email, or use phone while seeing better.

In question 7 on her online survey, (what are the most important benefits of this case? Rank 1 for best), people said the most important and their favorite was how easy the case/device is to use at 52.5%, rank this benefit #1. With the most important benefit being easy to use, people can operate and utilize the case/device more quickly than finding and putting on glasses. This was one of her major points in her design criteria that the inventor wanted her device to have. The next highest benefit ranked was quick access/put away at 23.68%, accomplishing her design criteria as well.

The foldable support 100 can be applied to everyday environment because people use their phones every single day and use them often from reading and replying to their emails, or trying to read a map to get somewhere. People carry their phones around with them throughout the day like a wallet or purse or maybe more often.

In question 6 of her online survey the inventor asked how people will use the case the most. The top 4 activities were: viewing the screen better (73.5.8%), reading and replying to email (60.38%), reading and replying to text (54.72%), and reading a map (54.72%). Her case also met her design requirements in this category as well. People use phones daily, more like constantly in their life to help them make their life easier, from finding directions to a movie to playing the best app ever.

The inventor learned a lot in this process. The inventor have never before conducted product research for a new design, figuring out who her target is and identifying their needs, checking any competition, exploring concepts for designs, creating a prototype, testing different materials, testing the prototype, re-designing, the whole engineering process as well. The inventor also has to develop a survey, a video demo and review the survey results. Within that process, the inventor had to figure out at how many revisions the inventor would need before achieving a solid prototype the inventor could show people. The inventor learned how to try out different materials for her prototype without spending a lot of money. From looking at existent glues her father already as part of his workbench, to recycling old and cheap glasses temples (side straight piece of a pair of glasses) as kickstands. The inventor even used a Lego piece, from our family's large assortment, to act as the clip. The inventor also learned a lot about recording every glue, material, method, etc. The inventor tries, so the inventor knows how to complete the task right the next time. This included drawing sketches in her notebook, writing notes in her notebook, & taking pictures. Talking with people during a face-to-face survey was very helpful since they would give immediate feedback on what they thought should be changed. The inventor interviewed a couple engineers that were parents so they gave some great mechanical/design feedback.

One other lesson the inventor learned during this process was repurposing of objects. Like using vinyl, which is normally used to make or repair new curtains to using the vinyl to extend the binding in the case to have enough room for the kickstand. For the entire project, the inventor used this concept. A couple more examples would be using random household objects like a bookend as a weight while gluing and spare eyeglasses & phone cases were repurposed for her kickstand design.

Another important lesson the inventor learned was to fail. Each time, the inventor learned one other way of how not to do the task, but learned a helpful piece of information for the future. While not succeeding to accomplish one task, many times the inventor would come to think how to solve the problem in a new way the inventor would have never thought of before.

In an example, a magnifying device 302 is attachable to a mobile device 10. The magnifying device 302 includes supporting structure such as the cover 240 and the stand 306 to maintain a lens 302 in a fixed position in space above and in remote relation to a screen 12 of the mobile device 10 so that an image of the screen 12 may be viewed through and magnified by the lens 302. The supporting structure, including the cover 240 and the stand 306, is rotatably attached to a periphery rim of the lens 302. When not in use, the lens 302 and the stand 306 may be folded to reduce the space occupied by the lens 302 and its support.

The foldable support 100 having the lens system 300 works to allow a user to see phone screen 12 better/without "reader glasses," provides quicker readability (instead of finding, pulling out, and putting on glasses), hides easy/quicker to tuck away, magnifies all text, apps, and maps, or anything else on the screen 12, and still allow a user to type or text or tap on the phone screen 12.

The exemplary embodiments described herein are provided merely to illustrate the principles of the invention and should not be construed as limiting the scope of the subject matter of the terms of the claimed invention. For example, humans process information in a variety of ways. For example, on seeing an image, a user may then think about what was seen which, in turn, might generate human feelings from those seen images. By employing knowledge and cognitive system techniques, object and object cluster shapes and images presented by each of the same may be developed to better coordinate the message sent with the message received. The principles of the invention may be applied toward a wide range of systems to achieve the advantages described herein and to achieve other advantages or to satisfy other objectives, as well.

What is claimed is:

1. A foldable support for a mobile device, the foldable support comprising:
a shell configured to receive and removably secure a mobile device casing of the mobile device in a cavity, wherein the mobile device includes a screen and the mobile device casing which receives and secures the screen and other components of the mobile device, wherein the cavity of the shell has a shell rectangle shape with a first long side parallel to a second long side and a first short side parallel to a second short side, wherein each short side is shorter than each long side;

a cover rotatably connected to the shell through a case hinge that extends along the first long side, wherein the cover has a cover rectangle shape that is equal to the shell rectangle shape;

a lens rotatably connected to the cover through a cover hinge, wherein the lens has a lens rectangle shape that is equal to the shell rectangle shape; and a stand rotatably connected to the lens at a proximate end of the stand through a stand hinge so that the stand is remote from the cover and the lens resides between the cover and the stand, wherein the case hinge, the cover hinge, and the stand hinge are arranged to create a fold such that, when a mobile device is placed in the shell cavity and the foldable support is in a closed position, the stand is parallel and adjacent to both the case hinge and the lens, and the lens resides protected between the mobile device screen and the cover of the foldable support, and wherein the shell further includes a clip configured to receive and removably secure the distal end of the stand when the stand is perpendicular to the lens.

2. The foldable support according to claim 1, wherein, in a case where the foldable support is in an open position with the stand perpendicular to the lens, the stand and the cover cooperate to maintain the lens in a fixed position in space above the screen in a plane parallel to the screen so that, when an image of the screen is magnified and displayed by the lens, the image is reproduced without distortion caused by the lens being position at an angle to the screen.

3. The foldable support according to claim 2, wherein the stand includes the proximate end and the distal end on an end of the stand opposite to the proximate end.

4. The foldable support according to claim 1, wherein, when the stand maintains the lens in a fixed position in space above the screen so that an image of the screen is magnified and displayed by the lens, a location at which the stand is rotatably connected to the lens and remotely positioned from the cover allows a user to insert their hand between the lens and the screen without coming into contact with the stand while allowing the user to press down on the screen of the mobile device.

5. The foldable support according to claim 1,
wherein the shell and the cover are part of a foldable support case as a single piece construction, and
wherein the lens and the stand are part of a multi piece construction lens system.

6. The foldable support according to claim 1, wherein the stand rotates remote and away from the shell and towards the lens in an arrangement having an angle of rotation that is limited to no more than ninety degrees by the stand hinge on one end of the angle of rotation and the lens on the other end of the angle of rotation.

7. The foldable support according to claim 6, wherein the stand is configured to rotate remote and away from the shell and parallel to and against the lens.

8. The foldable support according to claim 7, wherein, when a mobile device is placed in the shell cavity and the foldable support is in a closed position, the lens will have rotated to be parallel to and against the cover so that the stand is sandwiched between the cover on a first side and the lens and then the screen of the mobile device on a second side.

9. A method to manufacture a foldable support, the method comprising:

presenting a shell configured to receive and removably secure a mobile device casing of the mobile device in a cavity, wherein the mobile device includes a screen and the mobile device casing which receives and secures the screen and other components of the mobile device, wherein the cavity of the shell has a shell rectangle shape with a first long side parallel to a second brig side and a first short side parallel to a second short side, wherein each short side is shorter than each long side;

connecting a cover rotatably to the shell through a case hinge that extends along the first long side, wherein the cover has a cover rectangle shape that is equal to the shell rectangle shape;

connecting a lens rotatably to the cover through a cover hinge, wherein the lens has a lens rectangle shape that is equal to the shell Rectangle shape; and connecting a stand rotatably to the lens at a proximate end of the stand through a stand hinge so that the stand is remote from the cover and the lens resides between the cover and the stand, wherein the case hinge, the cover hinge, and the stand hinge are arranged to create a fold such that, when a mobile device is placed in the shell cavity and the foldable support is in a closed position, the stand is parallel and adjacent to both the case hinge and the lens, and the lens resides protected between the mobile device screen and the cover of the foldable support, and wherein the shell further includes a clip configured to receive and removably secure the distal end of the stand when the stand is perpendicular to the lens.

10. The method according to claim 9, wherein, in a case where the foldable support is in an open position with the stand perpendicular to the lens, the stand and the cover cooperate to maintain the lens in a fixed position in space above the screen in a plane parallel to the screen so that, when an image of the screen is magnified and displayed by the lens, the image is reproduced without distortion caused by the lens being position at an angle to the screen.

11. The method according to claim 10, wherein the stand includes the proximate end and the distal end on an end of the stand opposite to the proximate end, and
wherein the shell further includes a clip configured to receive and removably secure the distal end of the stand when the stand is perpendicular to the lens.

12. The method according to claim 9, wherein, when the stand maintains the lens in a fixed position in space above the screen so that an image of the screen is magnified and displayed by the lens, a location at which the stand is rotatably connected to the lens and remotely positioned from the cover allows a user to insert their hand between the lens and the screen without coming into contact with the stand while allowing the user to press down on the screen of the mobile device.

13. The method according to claim 9,
wherein connecting the cover rotatably to the shell through the case hinge includes making the case hinge of a pliable material, where the pliable material extends along both the cover and the shell as part of a foldable support case that is a single piece construction and,
wherein the lens and the stand are part of a multi piece construction lens system.

14. The method according to claim 9, wherein the stand rotates remote and away from the shell and towards the lens in an arrangement having an angle of rotation that is limited to no more than ninety degrees by the stand hinge on one end of the angle of rotation and the lens on the other end of the angle of rotation.

15. The method according to claim 14, wherein the stand is configured to rotate remote and away from the shell and parallel to and against the lens.

16. The method according to claim 15, wherein, when a mobile device is placed in the shell cavity and the foldable support is in a closed position, the lens will have rotated to be parallel to and against the cover so that the stand is sandwiched between the cover on a first side and the lens and then the screen of the mobile device on a second side.

17. A foldable support product produced by process to manufacture a foldable support, the process comprising;
    presenting a shell configured to receive and removably secure a mobile device casing of the mobile device in a cavity, wherein the mobile device includes a screen and the mobile device casing which receives and secures the screen and other components of the mobile device, wherein the cavity of the shell has a shell rectangle shape with a first long side parallel to a second long side and a first short side parallel to a second short side, wherein each short side is shorter than each long side;
    connecting a cover rotatably to the shell through a case hinge that extends along the first long side, wherein the cover has a cover rectangle shape that is equal to the shell rectangle shape;
    connecting a lens rotatably to the cover through a cover hinge, wherein the lens has a lens rectangle shape that is equal to the shell rectangle shape; and
    connecting a stand rotatably to the lens at a proximate end of the stand through a stand hinge so that the stand is remote from the cover and the lens resides between the cover and the stand,
    wherein the case hinge, the cover hinge, and the stand hinge are arranged to create a fold such that, when a mobile device is placed in the shell cavity and the foldable support is in a closed position, the stand is parallel and adjacent to both the case hinge and the lens, and the lens resides protected between the mobile device screen and the cover of the foldable support, and
    wherein the shell further includes a clip configured to receive and removably secure the distal end of the stand when the stand is perpendicular to the lens.

18. The foldable support product according to claim 17, wherein, in a case where the foldable support is in an open position with the stand perpendicular to the lens, the stand and the cover cooperate to maintain the lens in a fixed position in space above the screen in a plane parallel to the screen so that, when an image of the screen is magnified and displayed by the lens, the image is reproduced without distortion caused by the lens being position at an angle to the screen.

19. The foldable support product according to claim 18, wherein the stand includes the proximate end and the distal end on an end of the stand opposite to the proximate end.

20. The foldable support product according to claim 17, wherein, when the stand maintains the lens in a fixed position in space above the screen so that an image of the screen is magnified and displayed by the lens, a location at which the stand is rotatably connected to the lens and remotely positioned from the cover allows a user to insert their hand between the lens and the screen without coming into contact with the stand while allowing the user to press down on the screen of the mobile device.

\* \* \* \* \*